UNITED STATES PATENT OFFICE.

BERNARD HERSTEIN, OF BAYONNE, NEW JERSEY.

STARCH.

982,673.

Specification of Letters Patent.

Patented Jan. 24, 191

No Drawing.

Application filed March 28, 1910. Serial No. 551,820.

*To all whom it may concern:*

Be it known that I, BERNARD HERSTEIN, a citizen of the United States, resident of Bayonne, Hudson county, State of New Jersey, (post-office address 1744 Willard street, Washington, District of Columbia,) have invented certain new and useful Improvements in Starch and Processes for Making Same, of which the following is a specification.

My invention relates to a new manner of treating starch or starch-containing materials for the purpose of converting it into a new and hitherto unknown form, which owing to several characteristic properties thereby acquired renders the starch more useful and more valuable for certain purposes as, for instance, in nitrating starch, in manufacturing glucose from starch, etc.

The most characteristic and distinguishing property of starch is its ability of paste-forming or gelatinizing as it is called, when heated with water above a certain temperature, which varies somewhat for the different kinds of starch. The treatment, to which I subject the starch, has for its object to deprive the starch of its ability of gelatinizing when heated with water. The process is inexpensive and easy to carry out, and the starch thereby acquires certain advantages not possessed by it before.

I proceed as follows: The starch or starch-containing material is steeped in a solution containing from about five to ten per cent. of formaldehyde and a quantity of an ammonium salt whose contents of ammonium is theoretically sufficient to form with the formaldehyde hexamethylene-tetramin, although an excess of either reagent, if not too large, will not materially alter the results. I have used for my experiments mostly ammonium chlorid, but have obtained just as good results with other ammonium-salts, especially inorganic, as for instance ammonium sulfate provided sufficient material was used and the time of reaction was modified. Starches from different sources vary to some extent in their behavior toward such a mixture of formaldehyde and ammonium salt, some requiring stronger solutions than others or a longer or shorter time of reaction. The main object of my invention being the production of an ungelatinizable starch, the quality of starch and the particular ratio of the ingredients is left to selection of the mar facturer.

I prefer to use an aqueous solution co taining from about five to ten per cent. formaldehyde and from six to eleven p cent. of ammonium chlorid, both ingredie being given in round numbers, to which t starch or the starch-containing material added until a preferably thin milk is tained. I preferably use a ratio of one p of starch to about three or four parts the solution, but any other convenient ra may be used without interfering with t results. The whole of the mixture is ke preferably at ordinary temperature *i. e.* 2 to 30° C., the ingredients being in intim contact, until a small sample withdra from the mass and diluted considerab with water does not show gelatinization heating and the starch granules sink to bottom of the test tube. The better the pr ess has been carried out, the quicker and t more completely will the starch settle out.

When the reaction is completed, the mi ture is allowed to settle, the liquid dra off and the residual starch filtered a washed, until the filtrate does not give a further reaction for the chlorin ion. It c then be dried. The starch thus obtain does not outwardly differ from ordina starch, but is nevertheless changed into wh may properly be called an allotropic for of starch with the properties described abov When properly washed, it contains none the solution-ingredients with which it can in contact. The same solution can be us over and over again, thus reducing the co of the process practically to the cost involv in the mechanical handling of the material The starch thus obtained is characteriz by its inability of gelatinizing or paste-forn ing, when heated with water, caustic alka or other starch-gelatinizing media. Dilu acids hydrolyze this starch with greater f cility and more completely, than is the ca with ordinary starch, a feature of whic this particular branch of the starch industr will eventually make considerable use, esp cially when considered in connection wit the fact that owing to its inability to g latinize very much smaller quantities water can be used and hence much mo concentrated solutions are eventually o tained. Besides this there are many mo commercial uses to which this modified for starch can be applied, depending on its actical inability to gelatinize with strong ids.

What I claim as new is:

1. The process of making insoluble non-latinizable starch, consisting of treating starch-containing material with a solution ntaining formaldehyde and an ammonium lt.

2. The process of making insoluble non-latinizable starch, consisting of treating starch-containing material with an aqueous solution of formaldehyde and an inorganic ammonium salt.

3. The process of making insoluble non-latinizable starch consisting of treating starch-containing material with an aqueous solution of approximately five to ten per cent. of formaldehyde and preferably six to eleven per cent. of ammonium chlorid.

4. The process of making insoluble non-latinizable starch consisting of treating starch containing material with a solution f formaldehyde and an ammonium salt in roportion substantially to form hexamethylene-tetramin.

5. The process of making insoluble non-latinizable starch consisting of treating starch containing material with a solution f formaldehyde and an ammonium salt at mperatures below the gelatinizing point of he starch used.

6. The process of making insoluble non-latinizable starch consisting of treating starch containing material with an aqueous solution of approximately five to ten per nt. formaldehyde and preferably six to even per cent. of ammonium chlorid at mperatures below the gelatinizing point of he starch used.

7. The process of making insoluble non-gelatinizable starch consisting of treating a starch containing material with a solution of formaldehyde and an inorganic ammonium salt at temperatures below the gelatinizing point of the starch used until a sample, when withdrawn and boiled with water does not show gelatinization and then washing away the formaldehyde and the ammonium salt.

8. The process of making insoluble non-gelatinizable starch consisting of treating a starch containing material with an aqueous solution of approximately five to ten per cent. of formaldehyde and preferably six to eleven per cent. of ammonium chlorid at temperatures below the gelatinizing point of the starch used until a sample, when withdrawn and boiled with water does not show gelatinization and then washing away the formaldehyde and the ammonium chlorid.

9. As a new article of manufacture a form of starch which does not gelatinize with water on heating nor is soluble therein to any appreciable extent.

10. As a new article of manufacture a form of starch, which does not gelatinize when heated with water and disintegrates readily in caustic alkalies and strong acids.

11. As a new article of manufacture a form of starch which does not gelatinize in caustic alkalies nor dissolve therein on heating.

12. As a new article of manufacture a form of starch with the outward appearance of ordinary starch but not gelatinizing or dissolving in hot water nor solutions of caustic alkalies.

BERNARD HERSTEIN.

Witnesses:
VICTOR K. CHESNUT,
EDWARD C. MERRILL.